United States Patent
Fan et al.

[11] Patent Number: 6,014,233
[45] Date of Patent: Jan. 11, 2000

[54] ERROR DIFFUSION FOR COLOR IMAGES WITH SEMI-VECTOR QUANTIZATION

[75] Inventors: Zhigang Fan; Steven J. Harrington, both of Webster, N.Y.

[73] Assignee: Xerox Corporation, Stamford, Conn.

[21] Appl. No.: 09/093,924

[22] Filed: Jun. 9, 1998

[51] Int. Cl.[7] .............................. H04N 1/46; G06K 9/36; G06K 9/38; G06K 9/46
[52] U.S. Cl. .......................... 358/515; 358/525; 358/534; 358/536; 382/253
[58] Field of Search ........................... 395/109; 358/515, 358/518, 519, 525, 530, 534, 536, 298; 382/162, 167, 252, 253; 399/181

[56] References Cited

U.S. PATENT DOCUMENTS

| | | | |
|---|---|---|---|
| 5,402,245 | 3/1995 | Motta et al. | 358/298 |
| 5,565,994 | 10/1996 | Eschbach | 358/298 |
| 5,621,546 | 4/1997 | Klassen et al. | 358/536 |
| 5,819,035 | 10/1998 | Devaney et al. | 358/465 |

OTHER PUBLICATIONS

"Selection and Use of Small Color Sets for Pictorial Display". by Venable, et al, Xerox Corporation, Webster, New York, SPSE's 43rd Annual Conference, May, 1990, Rochester, New York.

*Primary Examiner*—Kimberly A. Williams
*Attorney, Agent, or Firm*—Diana M. Cox

[57] ABSTRACT

A method for color error diffusion using semi-vector quantization is proposed that simplifies error diffusion calculations. When three color separations are used, the two separations with the most visually perceptive color output are compared with one another to determine their output colors, while the third, least visually perceptive separation, is treated separately. A correction term may be applied to the third separation based on the color output of the first two separations to insure uniformity of ink coverage. This method yields results close to vector quantization and also minimizes fluctuation in the two most visually perceptive output colors. Of course, this method may be used with more than three color separations. For example, when four color separations are used, the least visually perceptive color is processed differently than the three other color separations.

15 Claims, 2 Drawing Sheets

ERROR DIFFUSION FOR COLOR IMAGES WITH SEMI-VECTOR QUANTIZATION

The invention relates to an apparatus and a method for controlling colors printed by a printer or displayed on a monitor to reduce the visibility of error diffusion dot patterns with similar image quality as vector error diffusion, but with much less computation using semi-vector quantization.

BACKGROUND OF THE INVENTION

Error diffusion is a well known technique for reducing continuous tone images to a pattern of black and white spots for printing on a binary device. A process for error diffusion is disclosed in an article entitled "An Adaptive Algorithm for Spatial Greyscale" by Robert W. Floyd and Louis Steinberg, Proc. Soc. Inf. Disp. 17, 75–77 (1976). The process involves an algorithm which determines whether or not to print a dot at a certain location based on a comparison of the continuous tone data with a threshold value. Gray levels above a chosen threshold are assigned a dot to be printed and those below the threshold are not assigned a dot to be printed. If the threshold corresponds to midway between black and white, the method always chooses the closer of black and white. The inherent error resulting from such a choice is propagated in specified amounts to adjacent picture elements or pixels not yet considered to change the pixels prior to thresholding. This method produces a more accurate representation of a gray tone over a small area encompassing several dots than conventional halftoning. Hence, the error in the intensity of the digital image is diffused and, on average, zero.

The fraction of the error added to each neighbor depends on a set of weights, the total error being multiplied by the weight corresponding to a given neighbor and then added to the value of that neighbor. The choice of weight can greatly affect the image quality, and much has been said about weights appropriate for giving pleasing results. Examples of weights other than those in the original Floyd and Steinberg algorithm may be found in papers by Jarvis, Judice, and Ninke ("A Survey of Techniques for Display of Continuous-Tone Pictures on Bilevel Displays", Computer Graphics and Image Processing, 5, pp. 13–40, 1976), Stucki, ("Image Processing for Document Reproduction", *Advances in Digital Image Processing*, pp. 177–218, New York, Plenum, 1979), and Fan, ("A Simple Modification of Error Diffusion Weights", Proceedings of the IS&T 46th Annual Conference, pp. 113–114, Boston 1993) and in U.S. Pat. No. 5,353,127 to Shiau et al.

In the case of color, however, one cannot just apply simple error diffusion to each color component independently. To do so would produce noisy images. For example, a light blue can be produced by magenta and cyan pixels. But if the magenta and cyan are processed independently, then some pixels may have both magenta and cyan, yielding blue, while others have no ink at all, giving white. This mixture of white, blue, magenta and cyan will have more contrast and look noisier than pixels of magenta and cyan alone. The process of independently processing each channel can result in any and all of the eight possible pixel colors distributed over an image area.

The problem of image noisiness can be reduced by the method of vector error diffusion. In this scheme the color chosen for each pixel is the color in a selected color space closest to the desired value, where the desired value is the input value modified by the errors diffused from neighboring pixels. This tends to confine the pixel colors to a subset near the input value and reduces the noise. What is known as vector error diffusion was described in a paper by Venable et al., "Selection and Use of Small Color Sets for Pictorial Display", Proc IS&T Annual Meeting, Rochester, 1990 and in a paper by Miller et al. "Color Halftoning Using Error Diffusion and a Human Visual System Model", Proc IS&T Annual Meeting, Rochester, 1990. In vector error diffusion colors are treated as points in a three dimensional space, with the colors printable or displayable at a given pixel discrete locations within that space. When a continuous tone color is to be displayed, the closest displayable or printable color is selected, and the error (the difference between the input color and added error, and the output color) is calculated as a vector in color space. Here, the "closeness" might be the simple distance in color space or a weighted distance based on the human visual model. The vector is the difference between the desired color and the available color. The (vector) error is then diffused in the same way as in normal error diffusion.

There are, however, some problems with vector error diffusion. One is the difficult three dimensional computation required to find the closest color at each pixel. Second, the method is unstable for colors that are near the gamut boundary. With these colors the addition of errors from neighboring pixels can take the desired color out of the gamut. Then the nearest color will generate an error that leads even further outside the gamut and the method collapses or produces unstable results. A third problem with some implementations of vector error diffusion is that the method may still not select the optimal set of colors. For example, it may produce a gray from white and black pixels, where a smoother image might be produced if cyan, magenta and yellow were used because there would be less luminance contrast.

U.S. patent application Ser. No. 08/885,691, entitled "Sum and Difference Error Diffusion" to Steven J. Harrington, filed Jun. 30, 1997, and assigned to the same assignee as the present invention, teaches a method for color error diffusion. Rather than applying error diffusion directly to the colors, this method uses the sum and differences of the colors. Using this method, error diffusion is only carried out on three channels with a simple decision tree selecting the output color at each pixel.

A solution to the third problem was proposed by U.S. Pat. No. 5,621,546 to Klassen et al. That patent suggests performing the error diffusion in two steps. The first is a simple error diffusion performed on the sum of the requested colorant amounts for the color separations. This indicates when color is needed, but does not tell which color should be selected. The pixel color closest to the desired color is chosen using a vector error diffusion process. This tends to disperse the color giving broad coverage of light colors rather than a pattern of dark spots on a white background. The improved image quality is at a cost of increased complexity (namely an additional error diffusion calculation).

U.S. Pat. No. 5,565,994 teaches multiples separation error diffusion with cross separation correlation control for color images. Each separation of the image is separately processed with an error diffusion process which takes into account the processing of another separation, if any. Output signals from a separation are used to determine threshold values for at least one other separation. The varying thresholds are used to vary the likelihood of the current pixel being a spot or no spot.

The references cited herein are incorporated by reference for their teachings.

SUMMARY OF THE INVENTION

In accordance with one aspect of the invention, there is provided an image processing system, including a processor preparing documents for color output devices, the documents being defined by plural separations, each separation including a set of color separation image signals describing optical density therein with c density levels, for an output color device rendering density with d density levels. A source of separation image signals representing optical density within the separation at one of c levels, for a discrete area therein is included as well as a halftone processor for receiving a group of separation image signals from each separation from the source, the group of separation image signals defining optical density for corresponding discrete areas of the document at c levels in each separation. A first calculating arrangement receives as inputs the group of separation image signals from at least two separations including a first separation and a second separation, and determining whether a first color associated with the first separation or a second color associated with the second separation color should be reproduced at the discrete area of the document. A first color output signal and a second color output signal are generated responsive to the input signals. A second calculating arrangement receives as input the group of separation image signals from at least one separation including a third separation, and determining whether a third color associated with the third separation should be deposited at the discrete area of the document, and generates a third color output signal responsive thereto, the at least one separation processed by the second calculating arrangement having less visual impact than the at least two separations processed by the first processing arrangement.

In accordance with another aspect of the invention, there is provided a halftoning processor preparing documents for reproducing at a color device, the documents defined by plural separations, each separation including a set of color separation image signals describing optical density therein with c density levels, for a destination color device rendering density with d density levels. A first separation signal input receives at least two color separations including a first and a second color separation image signals corresponding to a selected discrete area of the document and a second separation signal input receives at least one color separation including a third color separation image signals. A circuit sums the first and second separation image signals and a circuit compares the first and second separation image signals. A first color determination logic arrangement generates a first color associated with the first color separation image signals and a second color associated with the second color separation image signals whereby the first and the second color are reproduced at the discrete area and a second color determination logic arrangement generates a third color associated with the third color separation image signals whereby the third color is reproduced at the discrete area, the at least one color processed by the second color determination logic arrangement having less visual impact than the at least two color separations processed by the first color determination logic arrangement. An error distribution arrangement determines any differences between the received separation image signals and the output signals, and adds the determined difference, if any, to image signals corresponding to areas adjacent to the discrete area, to be processed.

In accordance with yet another aspect of the invention, there is provided a method of halftoning documents preparatory to reproducing at an output device the documents defined by plural separations, each separation including a set of color separation image signals describing optical density therein with c density levels, for a destination color output device rendering density with d density levels. At least two color separations including a first color and a second color separation image signals corresponding to a selected discrete area of the document are received and have been adjusted by error values distributed from previously processed discrete areas of the document. At least one color separation including a third color separation image signals corresponding to the selected discrete area of the document is received and have been adjusted by error values distributed from previously processed discrete areas of the document, the third color having less visual impact than the first and second colors. The first color and second color separation image signals for the discrete location of the document are added to create a sum value which is used to generate a first color output signal and a second color output signal whereby the first color and the second color are reproduced at the discrete area. A third color output signal whereby the third color is reproduced at the discrete area is produced.

In this invention a method for color error diffusion using semi-vector quantization is proposed that simplifies error diffusion calculations. Rather than using vector quantization to calculate and compare eight distance measurements when three output colors are used, the present invention uses a simplified processing of the separations. The two separations with the most visually perceptive color output are compared with one another to determine their output colors, while the third, least visually perceptive separation, is treated separately. A correction term may be applied to the third separation based on the color output of the first two separations to insure uniformity of ink coverage. This method yields results close to vector quantization and also minimizes fluctuation in the two most visually perceptive output colors. Of course, this method may be used with more than three color separations. For example, when four color separations are used, the least visually perceptive color is processed differently than the three other color separations.

These and other aspects and advantages of the invention will become apparent from the following detailed description of preferred embodiments when taken in conjunction with the accompanying drawings.

DETAILED DESCRIPTION OF THE INVENTION

Figure 1:
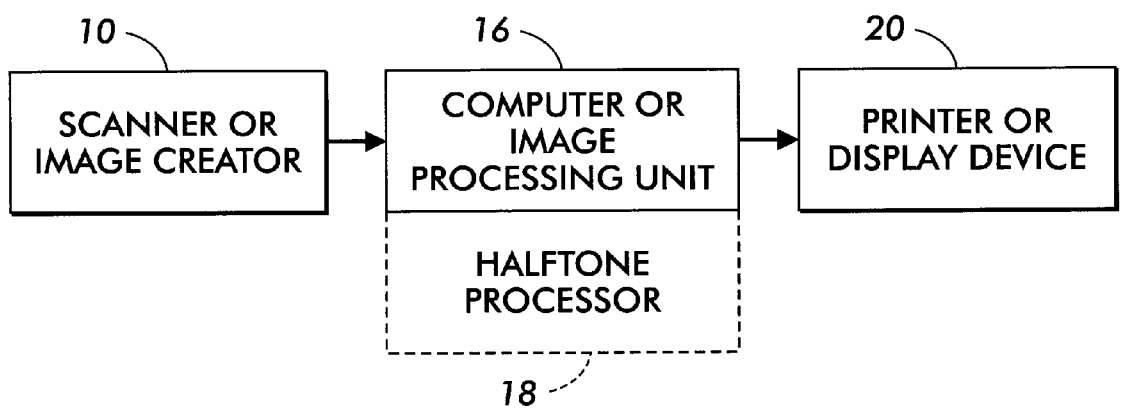
FIG. 1 shows a generalized system in which the present invention may find use.

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a density between a minimum and a maximum. Accordingly, pixels are defined by intensity and position. In the particular color system to be discussed, color documents are represented by multiple sets of image signals, each set (or separation) represented by an independent channel, which is usually processed independently. A "color image" as used herein is therefore a document including at least two separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a scanner/printer combination) is described for example, in U.S. Pat. No. 5,014,123 to Imoto, incorporated herein by reference. Each separation provides a set of image signals or separation pixels which will drive a printer to produce one color separation of the image. In the case of multicolor printers, the separations, superposed together, form the color image. In this context, pixels are described as discrete image signals, which represent optical density of the document image in a given small area thereof. The term "separation pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at m bits per pixel. This is the image creator, and can include or be any device which produces images to be printed, including computers or word processor, graphics art programs or the like.

Common color scanners produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16, which may be a programmed general purpose computer, or a special purpose processor, or the like. to be processed so that an image suitable for reproduction on image output terminal or printer 20 is obtained. Image processing unit 16 commonly includes a halftone processor 18, which can be a programmed computer operation or a special purpose processor, or the like which converts m bit digital image signals to n bit digital image signals, suitable for driving a particular printer, where m and n are integer values.

Before entering into a description of an embodiment of the invention, the principle of the invention will be discussed. A color pixel can be thought of as a point in a particular color space. In a three color dimensional space, each of three axes define the position of the pixel. Each axes can take on a different component of the color definition, depending on the color space. Thus, color may be defined in terms of r,g,b components; colorant C, M, Y components; or by other color space definitions, including HSV, LAB, etc., depending on the color definition. In color image vector error diffusion, the error is given by the difference between the input color with any prior error added thereto, and the output color. The output color will usually be the closest reproducible color. A vector, defined in terms of direction and magnitude, defines the difference. This vector can be added to the next color pixel in the color space, so that the next color pixel is moved in accordance with the added error. This method requires heavy computation in which vector quantization is used to calculate and compare 8 distance measurements when three output color components are used.

Figure 2:
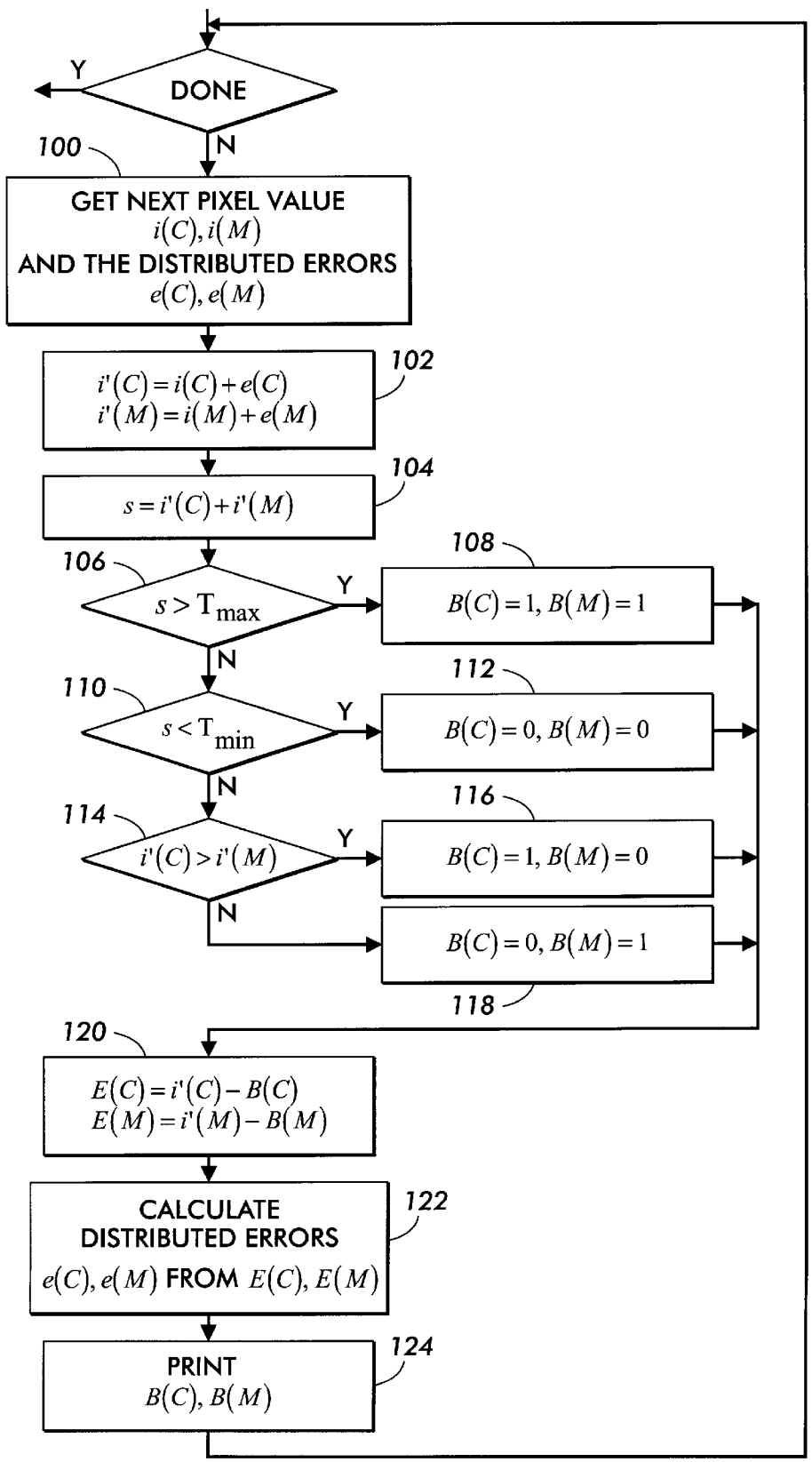
FIG. 2 shows the determination of the output color.

The present invention takes advantage of the fact that for color images, in order to yield the least perceptual noise, quantization is performed in perceptually orthogonal color spaces. This allows for the color components to be treated separately when performing quantization. Also, the fact that the lightness component should be treated differently than the chroma components to produce better quality and less noisy color images is used as taught in Venable et al., "Selection and Use of Small Color Sets for Pictorial Quality", SPSE's 43rd Annual Conf., May 1990, Rochester, New York, p.90–92. Taking these facts into consideration, the present invention is drawn to treating light and dark color components separately in the quantization step thereby allowing the quantization of the darkest color components to be coordinated with one another and the lightest color component(s) to be treated independently, it having the least visual impact on the color image. Any number of darkest color components may be compared with one another and any number of lightest color components may be treated independently of the darkest color components. For example, when three darkest color components are used in the method described in copending U.S. patent application Ser. No. 08/885,691 "Sum and Difference Error Diffusion" described above or any other image processing technique may be used to obtain the darkest color outputs, while the lightest color separation is processed separately from the darkest color separations. In the following example, color components CMY are used, however, any color space with substantially orthogonal components may be used. When using color components CMY, yellow is the lightest color and is processed independently of the darker cyan and magenta components. FIG. 2 shows the C and M components processed together to provide images with very little perceptual noise.

At step 100 in FIG. 2, the input pixel values for the cyan separation i(C) and magenta separation i(M) are obtained from the image source, originating from the scanner or image creator 10 and fed to the halftone processor by image processing unit 16. Also at step 100, the total distributed error for the cyan separation e(C) and the magenta separation e(M) for this pixel from the previous pixel values processed is received by the image processing system. Step 102 adds the distributed errors e(C) and e(M) to input pixel values i(C) and i(M) to obtain modified pixel values i'(C) and i'(M). Distributed error pixel values i'(C) and i'(M) are added at step 104 to produce sum S.

At step 106 a determination is made as to whether the value of S is greater than a maximum threshold value Tmax. If S is greater than Tmax, then the cyan separation binary output B(C) and the magenta separation binary output B(M) are both set equal to 1 or on at step 108, signaling the printing of ink. If S is less than Tmax then step 110 compares S to a minimum threshold value Tmin. Maximum threshold Tmax is generally greater than 1 and preferably 1.5, while minimum threshold Tmin is generally less than 1 and preferably 0.5. Since the sum of i'(C) and i'(M) is the total requested ink amount, and the printing process can produce 0, 1, or 2 spots of ink for each pixel, the Tmax (that decides between placing 1 or 2 spots) is set to 1.5, which is halfway between the choices. Similarly, for Tmin that is used to decide between 0 and 1 spots of ink, the halfway point of 0.5 is used. However, other values could be used, and it is the nature of error diffusion to accumulate error values until the accumulated error compensates for bias in the thresholds. If S is less than Tmin, B(C) and B(M) are set equal to 0 or off at step 112, indicating that no ink should be printed. When S is between Tmax and Tmin, step 114 compares i'(C) to i'(M). If i'(C) is greater than i'(M), then B(C) is set equal to 1 and B(M) is set equal to 0 at step 116. However, if i'(C) is not greater than i'(M), then B(C) is set equal to 0 and B(M) is set equal to 1 at step 114.

After each of steps 108, 112, 116, and 118 where B(C) and B(M) have been determined, the difference or error between the input pixel value and the binary output value of cyan separation E(C) and magenta separation E(M) is calculated at step 120. Distributed errors e(C) and e(M) are calculated from the actual error E(C) and E(M) using any well known error process at step 122.

At step 124, cyan or magenta is printed or displayed based on the values of B(C) and B(M) calculated above. If there are more pixels to process, then the procedure begins again at step 100. The above procedure not only yields results close to vector quantization, it also minimizes fluctuation in the darkest color component amounts.

Turning next to the lightest component, the yellow component output is independently determined using other conventional image processing techniques such as error diffusion or halftoning. As described earlier, independently processing yellow will have minimum affect on overall image quality due to the fact that it has the least visual impact on the image.

If uniformity of an output image is a problem with the independently processed color component, a correction term can be added to the threshold in determining yellow output. A correction term is given by $$\gamma[B(C)+B(M)-S]$$

where gamma is between 0 and 1 and B(C), B(M) and S are defined in the cyan and magenta quantization procedure above. The correction term should average to 0 with gamma depending upon the type of reproduction machine and ink used as well as the desired visibility of the yellow component. When the correction term is positive, the output of yellow is reduced and when the correction term is negative, the output of yellow is increased.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. An image processing system, including a processor preparing documents for color output devices, the documents defined by plural separations, each separation including a set of color separation image signals describing optical density therein with c density levels, for an output color device rendering density with d density levels, comprising:

a color output device;

a source of separation image signals representing optical density within the separation at one of c levels, for a discrete area therein;

a halftone processor receiving a group of separation image signals from each separation from the source, the group of separation image signals defining optical density for corresponding discrete areas of the document at c levels in each separation, comprising:

a first calculating arrangement receiving as inputs the group of separation image signals from at least two separations including a first separation and a second separation, and determining whether a first color associated with the first separation or a second color associated with the second separation color should be reproduced at the discrete area of the document, and generating a first color output signal and a second color output signal responsive thereto; and second calculating arrangement receiving as input the group of separation image signals from at least one separation including a third separation, and determining whether a third color associated with the third separation should be deposited at the discrete area of the document, and generating a third color output signal responsive thereto, the at least one separation processed by the second calculating arrangement having less visual impact than the at least two separations processed by the first processing arrangement.

2. The image processing system as defined in claim 1, wherein the first and second separations are cyan and magenta and the third separation is yellow.

3. The image processing system as defined in claim 1, wherein the first and second separations are red and green and the third separation is blue.

4. The Image processing system as defined in claim 1, wherein the first calculating arrangement includes:

a summing circuit, summing the received first and second separation image signals to create a sum value;

a first thresholding circuit, comparing the sum value to a set of first and second output thresholds, and producing output signals indicative thereof; and a second thresholding circuit, comparing the value of the first separation image signal with the second separation image signal, and producing output signals indicative thereof.

5. The printing system as defined in claim 1, wherein the second calculating arrangement further comprises:

a correction term calculator which calculates a correction term to be added to the separation image signals from the third separation when determining whether the third color should be reproduced at the discrete area of the document.

6. The printing system as defined in claim 5, wherein the correction term is defined by:

$\gamma[B(S1)+B(S2)-\text{sum}]$ where γ is between 0 and 1;

B(S1) is the first output signal;

B(S2) is the second output signal; and sum is the sum value.

7. The image processing system as defined in claim 1, wherein the at least two color separations includes:

a fourth separation, and determining whether a fourth color associated with the fourth separation should be reproduced at the discrete area of the document, and generating a fourth color output signal responsive thereto.

8. The image processing system as defined in claim 7, wherein the at least one color separation includes:

a fifth separation, and determining whether a fifth color associated with the fifth separation should be reproduced at the discrete area of the document, and generating fifth color output signal responsive thereto.

9. The image processing system as defined in claim 1, wherein the at least one color separation includes:

a fourth separation, and determining whether a fourth color associated with the fourth separation should be reproduced at the discrete area of the document, and generating a fourth color output signal responsive thereto.

10. A halftoning processor preparing documents for reproducing at a color device, the documents defined by plural separations, each separation including a set of color separation image signals describing optical density therein with c density levels, for a destination color device rendering density with d density levels, comprising:

a first separation signal input receiving at least two color separations including a first and a second color separation image signals corresponding to a selected discrete area of the document;

a second separation signal input receiving at least one color separation including a third color separation image signals;

a circuit to sum the first and second separation image signals;

a circuit to compare the first and second separation image signals;

a first color determination logic arrangement to generate a first color associated with the first color separation image signals and a second color associated with the second color separation image signals whereby the first and the second color are reproduced at the discrete area;

a second color determination logic arrangement to generate a third color associated with the third color separation image signals whereby the third color is reproduced at the discrete area, the at least one color processed by the second color determination logic arrangement having less visual impact than the at least two color separations processed by the first color determination logic arrangement; and an error distribution arrangement, determining any differences between the received separation image signals and the output signals, and adding the determined difference, if any, to image signals corresponding to areas adjacent to the discrete area, to be processed.

11. A method of halftoning documents preparatory to reproducing at an output device the documents defined by plural separations, each separation including a set of color separation image signals describing optical density therein with c density levels, for a destination color output device rendering density with d density levels, comprising the steps of:

receiving at least two color separations including a first color and a second color separation image signals corresponding to a selected discrete area of the document and having been adjusted by error values distributed from previously processed discrete areas of the document;

receiving at least one color separation including a third color separation image signals corresponding to the selected discrete area of the document and having been adjusted by error values distributed from previously processed discrete areas of the document, the third color having less visual impact than the first and second colors;

summing the first color and second color separation image signals for the discrete location of the document to create a sum value;

using the sum value to generate a first color output signal and a second color output signal whereby the first color and the second color are reproduced at the discrete area;

generating a third color output signal whereby the third color is reproduced at the discrete area; and determining any differences between the received separation image signals and the output signals, and adding the determined difference, if any, to image signals corresponding to areas adjacent to the discrete area, to be processed.

12. The method as defined in claim 11, wherein using the sum value includes the following steps:

if (sum value>Tmax) then B(S1)=B(S2)=1;

else if (sum value<Tmin) then B(S1)=B(S2)=0;

else if ((i(S1)>i(S2)) then B(S1)=1 and B(S2)=0;

else B(S1)=0 and B(S2)=1;

where i(S1) is the first color separation image signal, i(S2) is the second color separation image signal, Tmax is an upper threshold value, Tmin is a lower threshold value, B(S1) is the first color output signal, B(S2) is the second color output signal.

13. The method as defined in claim 11, wherein generating the third color output signal comprises:

calculating a correction term;

adding the correction term to a predetermined threshold value to provide a corrected threshold value; and thresholding the third color separation image signals with the corrected threshold value.

14. The method of 13 wherein the correction term is based on halftoning of the first and second separations.

15. The method of 13 wherein calculating the correction term includes:

$\gamma[B(S1)+B(S2)-\text{sum}]$ where γ is between 0 and 1;

B(S1) is the first output signal;

B(S2) is the second output signal; and sum is the sum value.

* * * * *